United States Patent
Seo et al.

(10) Patent No.: US 8,036,596 B2
(45) Date of Patent: Oct. 11, 2011

(54) METHOD AND APPARATUS FOR GENERATING DEVICE ADDRESS OF WIRELESS LOCAL NETWORK

(75) Inventors: Chang Woo Seo, Suwon-si (KR); Seung Hwan Oh, Suwon-si (KR); Dong Won Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 11/873,538

(22) Filed: Oct. 17, 2007

(65) Prior Publication Data

US 2008/0136707 A1 Jun. 12, 2008

(30) Foreign Application Priority Data

Dec. 6, 2006 (KR) .................. 10-2006-0123338

(51) Int. Cl.
*H04B 7/00* (2006.01)
*H04W 4/00* (2009.01)
(52) U.S. Cl. .................. 455/41.1; 455/41.2; 455/426.1; 343/367

(58) Field of Classification Search ............... 455/426.1, 455/426.2, 517, 518, 519, 41.1, 42.1
See application file for complete search history.

(56) References Cited

U.S. PATENT DOCUMENTS

| 2002/0183004 A1* | 12/2002 | Fulton et al. ............... 455/41 |
| 2006/0291425 A1* | 12/2006 | Park et al. ............... 370/331 |
| 2008/0153493 A1* | 6/2008 | Salokannel et al. .......... 455/436 |

* cited by examiner

*Primary Examiner* — Tilahun B Gesesse
(74) *Attorney, Agent, or Firm* — Sughrue Mion, PLLC

(57) ABSTRACT

An apparatus for generating a device address of a wireless local network includes an alien beacon determination unit which determines whether a received beacon is an alien beacon; a zone identity management unit which compares an alien zone identity included in the received beacon with a zone identity of a corresponding device if the received beacon is the alien beacon, and regenerates the zone identity of the corresponding device if the alien zone identity is identical to the zone identity of the corresponding device; and a device address generation unit which regenerates a device address of the corresponding device if a device address of an alien beacon group is identical to the device address of the corresponding device.

18 Claims, 7 Drawing Sheets

FIG. 4

| OCTETS:1 | OCTETS:1 | OCTETS:1 | OCTETS:1 | OCTETS:1 |
|---|---|---|---|---|
| ELEMENTID | NEW ZONE ID | CURRENT ZONE ID | COUNTDOWN | ZONE BIT SIZE |

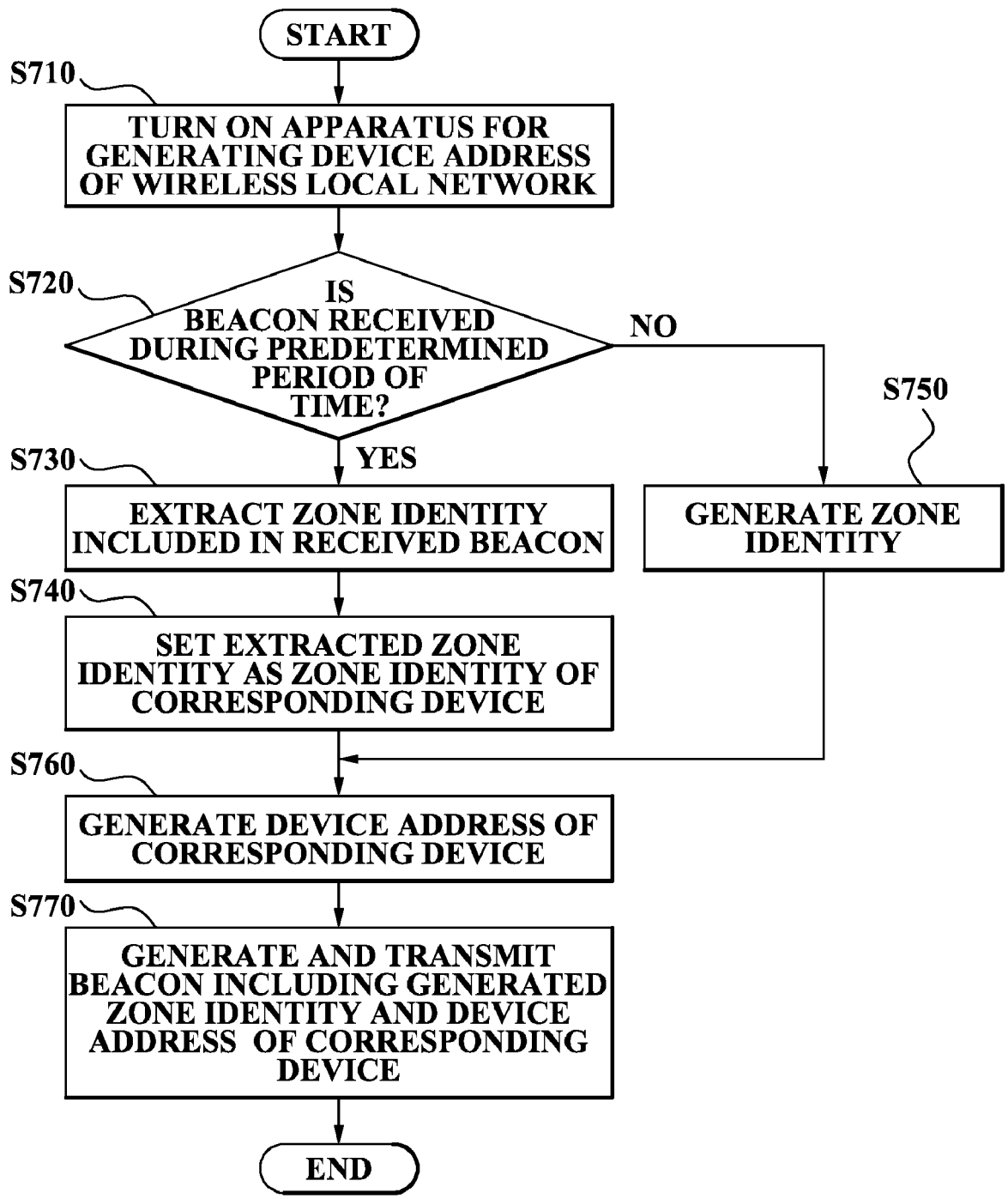

METHOD AND APPARATUS FOR GENERATING DEVICE ADDRESS OF WIRELESS LOCAL NETWORK

CROSS-REFERENCE TO RELATED APPLICATION

This application claims priority from Korean Patent Application No. 10-2006-0123338, filed on Dec. 6, 2006, in the Korean Intellectual Property Office, the disclosure of which is incorporated by reference in its entirety.

BACKGROUND OF THE INVENTION

1. Field of the Invention

Methods and apparatuses consistent with the present invention relate generally to generating a device address of a wireless local network, and more particularly, to generating a device address of a wireless local network by using a zone identity in a WiMedia medium access control (MAC).

2. Description of Related Art

Generally, a device address, which is set in a device within a beacon group, is generated by the device within the beacon group. In this case, WiMedia devices comprise the beacon group.

Specifically, the device address is generated by the device itself without a coordinator which controls the device within the beacon group.

In this case, the device address, which is generated by the device, is not used by the other devices comprising the beacon group. Also, device addresses may be randomly generated in each device.

A device within a beacon group generates a device address on its own without a coordinator, which causes a conflict among device addresses.

The conflict of device addresses is recognized when a device receives a frame which has a device address of the device, or receives a beacon frame or data frame possessing a beacon slot which is not used in the device, in the device having the same device address.

When the conflict of device addresses occurs, devices independently generate device addresses again. Accordingly, the conflict of device addresses may occur again, although Media Access Control (MAC) addresses are monitored.

Also, a great amount of time is spent in searching for MAC addresses where the conflict of device addresses does not occur, which affects a seamless communication.

The conflict of device addresses may occur when generating a same device address when two devices first join in a beacon group. Also, the conflict of device addresses may occur when a beacon group of a corresponding device is merged with an alien beacon group including a device having a device address identical to a device address of the corresponding device.

In this case, device addresses may be regenerated and used in a case that generates the same device address when two devices first join in the beacon group.

Conversely, when merged with an alien beacon group including the device having the device address identical to a device address of a device which is communicating, the conflict of device addresses is recognized and the device address is regenerated. Accordingly, communication may not be continuously performed, and network resources may not be efficiently used.

Thus, an apparatus for preventing device addresses from conflicting when merging with an alien beacon group is required to perform a continuous communication.

SUMMARY OF THE INVENTION

The present invention provides a method and apparatus for generating a device address of a wireless local network which generate a zone identity and a device address corresponding to the generated zone identity, and thereby may prevent device addresses from conflicting.

The present invention also provides a method and apparatus for generating a device address of a wireless local network which add a zone identity to a device address and change the zone identity when receiving an alien beacon period, and thereby may prevent device addresses from conflicting.

The present invention also provides a method and apparatus for generating a device address of a wireless local network which eliminate a possibility of a device address conflict after a mergence with an alien beacon period, and thereby may perform a continuous communication.

According to an aspect of the present invention, there is provided an apparatus for generating a device address of a wireless local network, the apparatus including: an alien beacon determination unit which determines whether a received beacon is an alien beacon; a zone identity management unit which compares an alien zone identity included in the received beacon with a zone identity of a corresponding device when the received beacon is the alien beacon, and regenerates the zone identity of the corresponding device when the alien zone identity is identical to the zone identity of the corresponding device; and a device address generation unit which regenerates a device address of the corresponding device when a device address of an alien beacon group is identical to the device address of the corresponding device.

In this case, the zone identity management unit may regenerate the zone identity of the corresponding device when a beacon group of the corresponding device is different from a dominant beacon group.

In this case, the zone identity management unit may convert the regenerated zone identity of the corresponding device into the alien zone identity, after the device address of the corresponding device is regenerated.

In this case, the zone identity management unit may include a zone identity detection unit which detects a zone identity included in the received beacon from the received beacon, a zone identity comparison unit which compares the detected zone identity with the zone identity of the corresponding device when the received beacon is the alien beacon, and a zone identity generation unit which regenerates the zone identity of the corresponding device when the detected zone identity is identical to the zone identity of the corresponding device.

In this case, the device address generation unit may regenerate the device address of the corresponding device after a beacon period of a beacon group of the corresponding device and a beacon period of the alien beacon group are merged.

In this case, the device address generation unit may regenerate the device address of the corresponding device, based on a beacon slot number of the corresponding device in the merged beacon period.

In this case, the device address generation unit may regenerate any one of a plurality of device addresses corresponding to the alien zone identity or the regenerated zone identity of the corresponding device, as the device address of the corresponding device.

According to another aspect of the present invention, there is provided an apparatus for generating a device address of a wireless local network, the apparatus including: a zone identity detection unit which detects a zone identity included in a received beacon from the received beacon; a zone identity setting unit which sets the detected zone identity as a zone identity of a corresponding device; and a device address generation unit which generates a device address corresponding to the set zone identity.

In this case, the apparatus for generating a device address of a wireless local network further includes a zone identity generation unit which generates the zone identity when a beacon is not received during a predetermined period of time, and the device address generation unit generates a device address corresponding to the generated zone identity.

According to another aspect of the present invention, there is provided a method of generating a device address of a wireless local network, the method including: determining whether a received beacon is an alien beacon; comparing an alien zone identity included in the received beacon with a zone identity of a corresponding device when the received beacon is the alien beacon; regenerating the zone identity of the corresponding device when the alien zone identity is identical to the zone identity of the corresponding device; and regenerating a device address of the corresponding device when a device address of an alien beacon group is identical to the device address of the corresponding device.

According to another aspect of the present invention, there is provided a method of generating a device address of a wireless local network, the method including: detecting a zone identity included in a received beacon from the received beacon; setting the detected zone identity as a zone identity of the corresponding device; and generating a device address corresponding to the set zone identity.

BRIEF DESCRIPTION OF THE DRAWINGS

The above and other aspects of the present invention will become more apparent from the following description of exemplary embodiments, taken in conjunction with the accompanying drawings of which:

FIG. 4 is a diagram illustrating an example of an information element of a regenerated zone identity;

FIG. 7 is a flowchart illustrating a method of generating a device address of a wireless local network according to another exemplary embodiment of the present invention.

DETAILED DESCRIPTION OF EXEMPLARY EMBODIMENTS OF THE INVENTION

Figure 1:
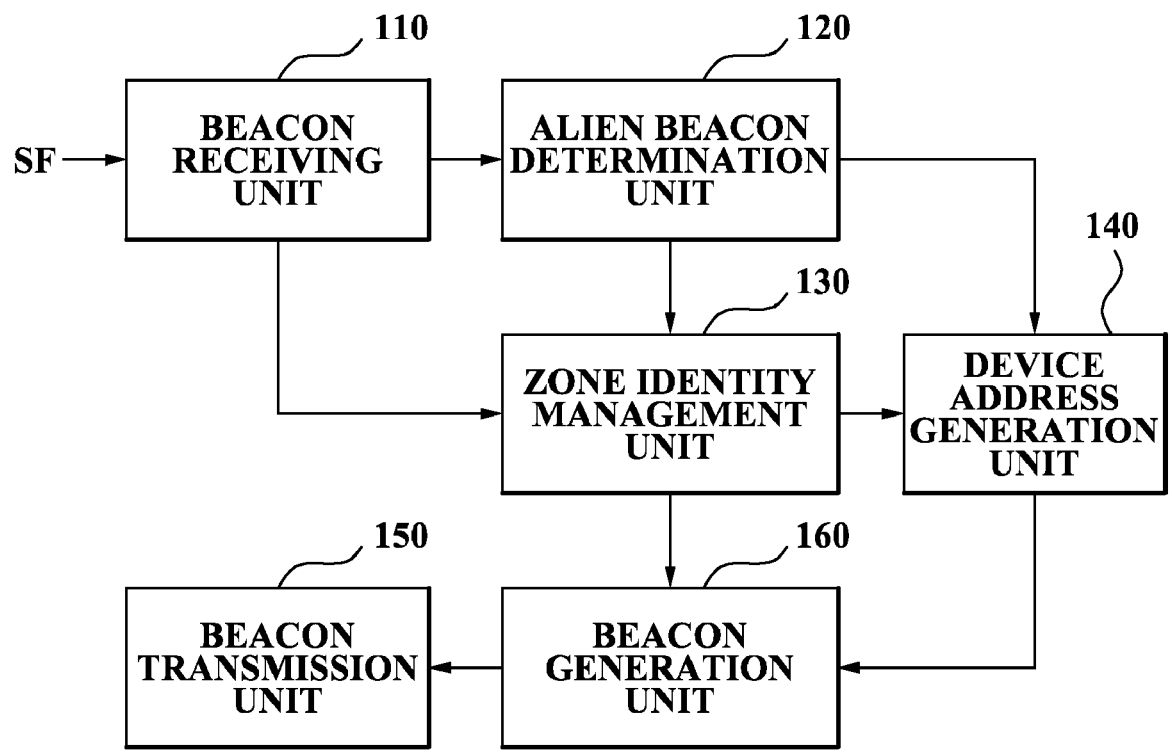
FIG. 1 is a block diagram illustrating an apparatus for generating a device address of a wireless local network according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating an apparatus for generating a device address of a wireless local network according to an exemplary embodiment of the present invention.

Referring to FIG. 1, the apparatus for generating a device address of a wireless local network includes a beacon receiving unit 110, an alien beacon determination unit 120, a zone identity management unit 130, a device address generation unit 140, a beacon transmission unit 150, and a beacon generation unit 160.

The beacon receiving unit 110 receives a beacon in a superframe period.

The alien beacon determination unit 120 determines whether the beacon, received in a corresponding device, is received from an alien beacon group.

Specifically, the alien beacon determination unit 120 determines whether the beacon of the received superframe is an alien beacon.

In this case, the alien beacon determination unit 120 may determine whether an alien beacon is received, through a beacon period start time of the received superframe.

The zone identity management unit 130 compares an alien zone identity, included in the received beacon, with a zone identity of the corresponding device when the received beacon is an alien beacon. Also, the zone identity management unit 130 regenerates the zone identity of the corresponding device when the alien zone identity is identical to the zone identity of the corresponding device.

Specifically, the zone identity management unit 130 extracts the zone identity included in the received beacon, and compares the extracted zone identity with the zone identity of the corresponding device, when the received beacon is an alien beacon according to a determination of the alien beacon determination unit 120. Also, the zone identity management unit 130 regenerates the zone identity of the corresponding device when the extracted zone identity is identical to the zone identity of the corresponding device.

In this case, the zone identity management unit 130 may regenerate the zone identity of the corresponding device when a beacon group of the corresponding device is different from a dominant beacon group. Specifically, the zone identity management unit 130 does not regenerate the zone identity of the corresponding device when the beacon group of the corresponding device is the dominant beacon group.

Here, the zone identity, regenerated by the zone identity management unit 130, or a zone identity, set as the beacon group of the corresponding device, is compared with a zone identity included in the alien beacon when receiving the beacon from an alien beacon group, and thus a device address conflict may be prevented and a continuous communication may be provided when merging two beacon groups.

Specifically, the device address conflict among devices included in two beacon groups indicates both the zone identities and device addresses of the devices, included in the two beacon groups, are identical. Accordingly, when the zone identities of the two beacon groups are identical, only zone identity of the beacon group, which is not the dominant beacon group, is changed, and thereby may prevent the device address conflict among devices included in the two beacon groups.

In this case, a sum of a bit length of the zone identity and a bit length of the device address is 16-bits. As an example, when the bit length of the zone identity is 3-bits, the bit length of the device address may be 13-bits.

In this case, the zone identity management unit 130 may generate zone change information for informing the regenerated zone identity of devices included in the beacon group of the corresponding device. Here, the zone change information may include a current zone identity, the regenerated zone identity, a point in time to change into the regenerated zone identity, and the like.

The device address generation unit 140 regenerates a device address of the corresponding device when a device address of an alien beacon group is identical to the device address of the corresponding device.

In this case, the device address generation unit 140 may regenerate the device address of the corresponding device when the beacon group of the corresponding device is different from the dominant beacon group.

In this case, the device address generation unit 140 may regenerate any one of a plurality of device addresses corresponding to the zone identity, regenerated by the zone identity management unit 130, as the device address of the corresponding device.

In this case, the device address generation unit 140 may regenerate the device address of the corresponding device after a beacon period of the beacon group of the corresponding device and a beacon period of the alien beacon group are merged. Here, an operation of merging the two beacon periods is not described since it is well-known to those skilled in the related art.

In this case, the device address generation unit 140 may regenerate the device address of the corresponding device, based on a beacon slot number of the corresponding device in the merged beacon period.

As described above, the apparatus for generating a device address of a wireless local network regenerates the device address of the corresponding device based on the beacon slot number of the corresponding device in the merged beacon period, as opposed to randomly regenerating the device address of the corresponding device. Accordingly, a period of time to generate the device address may be reduced, and a conflict of device addresses among devices which may reoccur when regenerating the device address may be prevented.

In this case, the device address generation unit 140 may regenerate any one of a plurality of device addresses corresponding to the alien zone identity, as the device address of the corresponding device.

In this case, the zone identity management unit 130 may convert the regenerated zone identity of the corresponding device into the alien zone identity, after the device address of the corresponding device is regenerated.

The beacon generation unit 160 generates a beacon including either the zone identity, regenerated by the zone identity management unit 130, or the device address, regenerated by the device address generation unit 140.

The beacon transmission unit 150 transmits the beacon, generated by the beacon generation unit 160, to the beacon period of the superframe.

As described above, the apparatus for generating a device address of a wireless local network changes the zone identity of the beacon group, which is not the dominant beacon group, when the two beacon groups including same zone identities are merged. Also, the apparatus for generating a device address of a wireless local network regenerates the device address of the corresponding device when the device address of the corresponding device is identical to a device address of the dominant beacon group. Accordingly, the device address conflict may be prevented.

Figure 2:
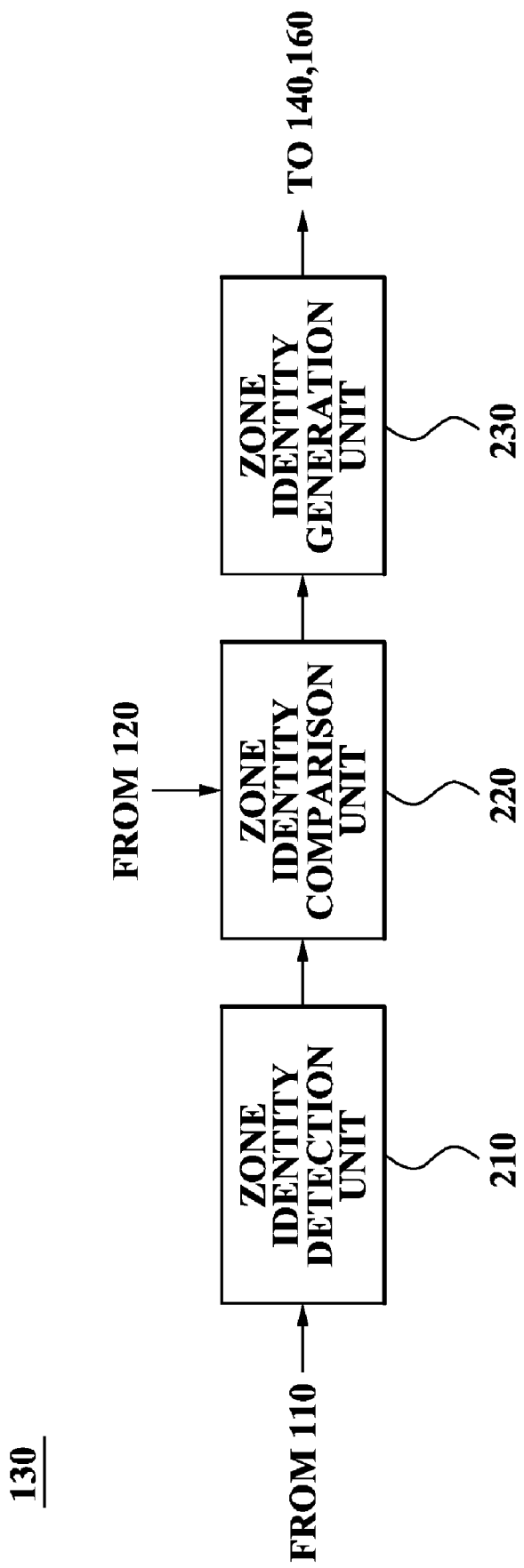
FIG. 2 is a block diagram illustrating a zone identity management unit illustrated in FIG. 1.

FIG. 2 is a block diagram illustrating the zone identity management unit 130 illustrated in FIG. 1.

Referring to FIG. 2, the zone identity management unit 130 includes a zone identity detection unit 210, a zone identity comparison unit 220, and a zone identity generation unit 230.

The zone identity detection unit 210 detects a zone identity from a beacon received in a corresponding device.

In this case, the zone identity may be detected from an information element including the zone identity of information elements comprising a beacon. The information element including the zone identity may include a zone identity field and a zone identity bit size field.

The zone identity comparison unit 220 compares a zone identity of the corresponding device with the zone identity, detected by the zone identity detection unit 210, when the received beacon is an alien beacon, and determines whether the zone identity of the corresponding device is identical to the zone identity detected by the zone identity detection unit 210.

The zone identity generation unit 230 regenerates the zone identity of the corresponding device when the zone identity of the corresponding device is identical to a zone identity of an alien beacon group.

In this case, the zone identity generation unit 230 may regenerate the zone identity of the corresponding device when a beacon group of the corresponding device is different from a dominant beacon group.

In this case, the zone identity generation unit 230 may convert the zone identity of the corresponding device into a zone identity of the alien beacon group after regenerating a device address of the corresponding device.

Figure 3:
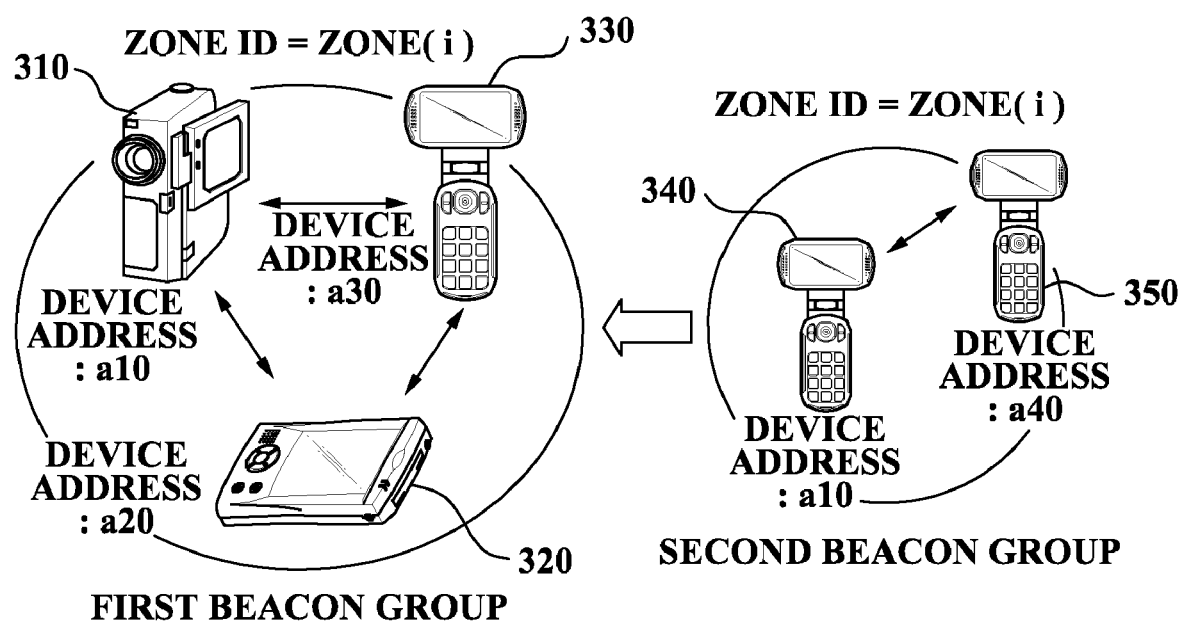
FIG. 3 is a diagram illustrating an example of an apparatus which generates a device address of a wireless local network, illustrated in FIG. 1, according to an exemplary embodiment of the present invention.

FIG. 3 is a diagram illustrating an example of an apparatus which generates a device address of the wireless local network illustrated in FIG. 1, according to an exemplary embodiment of the present invention.

Here, it is assumed that a first beacon group is a dominant beacon group.

Referring to FIG. 3, a zone identity of the first beacon group is zone(i), and the first beacon group includes devices 310, 320, and 330. In this instance, a device address of each of the devices is a10, a20, and a30, respectively. A zone identity of a second beacon group is zone(i), which is identical to the zone identity of the first beacon group. Also, the second beacon group includes devices, i.e. a first device 340 and a second device 350. In this instance, a device address of the first device is a10 and a device address of the second device is a40.

When the first device 340 and the second device 350 of the second beacon group move to the first beacon group, and the first device 340 receives a beacon transmitted from the devices 310, 320, and 330 of the first beacon group, it is recognized that an alien beacon is received through a received beacon period start time.

The zone identity, zone(i), included in the received alien beacon, is extracted. Also, the extracted zone identity, zone(i), and a zone identity of a corresponding device, i.e. the zone identity of the second beacon group, zone(i), are compared.

The first device 340 regenerates the zone identity of the corresponding device, since the zone identity of the first beacon group, zone(i), is identical to the zone identity of the second beacon group, zone(i). As an example, the first device 340 regenerates a zone identity, zone(k).

The first device 340 generates information elements including the generated zone identity, zone(k), and transmits a beacon including the generated information element. In this instance, the information element including the zone identity, zone(k), is illustrated as FIG. 4.

FIG. 4 is a diagram illustrating an example of an information element of a regenerated zone identity.

Referring to FIG. 4, the regenerated zone identity includes an elementID, a new zone ID, a current zone ID, a countdown, and a zone bit size field.

The elementID is a field indicating information element of the regenerated zone identity.

The new zone ID is a field indicating the regenerated zone identity. In this case, the new zone ID may be zone(k).

The current zone ID is a field indicating a zone identity which is currently used. In this case, the current zone ID may be zone(i).

The countdown is a field indicating a point in time to use the regenerated zone identity. In this case, the countdown may be a superframe unit value.

The zone bit size is a field indicating a zone bit size.

When a first device 340 transmits a beacon including information element illustrated in FIG. 4, a second device 350 receives the information element including the regenerated zone identity.

The second device 350 converts the zone identity of the second device 350, zone(i), into the regenerated zone identity, zone(k), based on a value which is set in the countdown field. The first device 340 also converts the zone identity of the first device 340, zone(i), into the regenerated zone identity, zone (k), when the second device 350 converts the zone identity of the second device 350, zone(i), into the regenerated zone identity, zone(k).

When the zone identity of a second beacon group is converted, beacon periods of a first beacon group and the second beacon group are merged.

The first device 340 regenerates a device address of the first device 340 since the device address of the first device 340, a10, is identical to a device address of a device included in the first beacon group.

In this case, the first device 340 may regenerate the device address of the first device 340, based on a beacon slot number of the first device 340 from among device addresses corresponding to the zone(i). As an example, the first device 340 may regenerate the device address of the first device 340 as a50.

In this case, the first device 340 may regenerate the device address of the first device 340, based on the beacon slot number of the first device 340 from among device addresses corresponding to the zone(k).

Here, the device address, regenerated in the first device 340, is transmitted to the second device 350 via the beacon including the information element about a device address regeneration. The information element about the device address regeneration may include a regenerated device address field and a field about when to use the regenerated device address.

The device address of the second device 350, a40, is different from a device address of the devices 310, 320, and 330 included in the first beacon group. Accordingly, the second device 350 uses the device address of the second device 350, a40, or may regenerate the device address of the second device 350, based on a beacon slot number of the second device 350 from among device addresses corresponding to the zone(i).

When the device addresses of the first device 340 and the second device 350 included in the second beacon group are changed, a zone identity of the second beacon group matches a zone identity of a dominant beacon group, since the first beacon group and the second beacon group are merged. Specifically, the zone identity of the first device 340 and the second device 350 included in the second beacon group, zone(k), is converted into the zone identity of the devices 310, 320, and 330 included in the first beacon group, zone(i).

Through the operation described above, a device address conflict of devices comprising the two beacon groups may be prevented, and a continuous communication may be performed.

Figure 5:
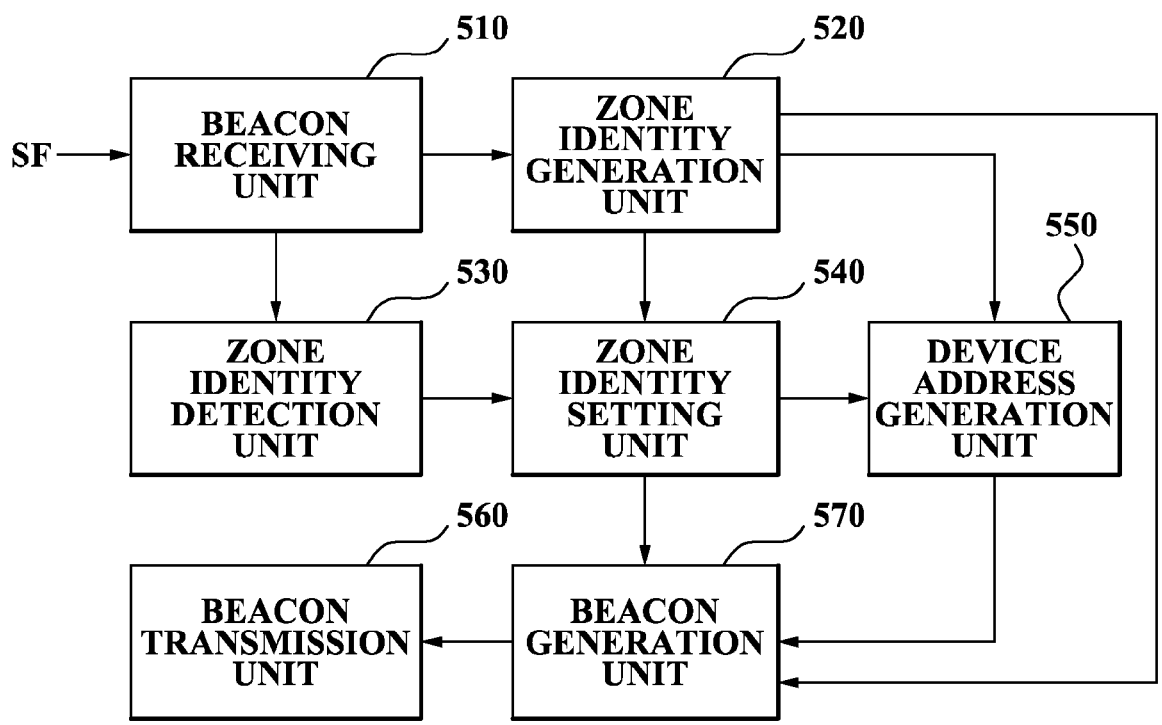
FIG. 5 is a block diagram illustrating an apparatus which generates a device address of a wireless local network according to another exemplary embodiment of the present invention.

FIG. 5 is a block diagram illustrating an apparatus which generates a device address of a wireless local network according to another exemplary embodiment of the present invention.

Here, FIG. 5 illustrates the apparatus which generates a device address in a same beacon group.

Referring to FIG. 5, the apparatus which generates a device address of a wireless local network includes a beacon receiving unit 510, a zone identity generation unit 520, a zone identity detection unit 530, a zone identity setting unit 540, a device address generation unit 550, a beacon transmission unit 560, and a beacon generation unit 570.

The beacon receiving unit 510 receives a beacon in a superframe period.

The zone identity generation unit 520 generates a zone identity when a beacon is not received in the beacon receiving unit 510 during a predetermined period of time. Specifically, when a corresponding device is turned on and another device included in a beacon group does not exist, the corresponding device generates the zone identity since the beacon is not received in the beacon receiving unit 510.

The zone identity detection unit 530 detects the zone identity included in the received beacon when the beacon is received in the beacon receiving unit 510.

The zone identity setting unit 540 sets the zone identity, detected by the zone identity detection unit 530, as a zone identity of the corresponding device.

Specifically, after the corresponding device is turned on, and the beacon is received while the zone identity is not set, the zone identity, detected by the zone identity detection unit 530, is set as the zone identity of the corresponding device.

The device address generation unit 550 generates either the zone identity generated by the zone identity generation unit 520, or the device address corresponding to the zone identity set by the zone identity setting unit 540.

In this case, the device address generation unit 550 may generate the device address of the corresponding device, based on a beacon slot number of the corresponding device.

The beacon generation unit 570 generates a beacon including the device address, generated by the device address generation unit 550, and any one of the zone identity, generated by the zone identity generation unit 520, and the zone identity, set by the zone identity setting unit 540.

The beacon transmission unit 560 transmits a superframe including the beacon generated by the beacon generation unit 570.

Figure 6:
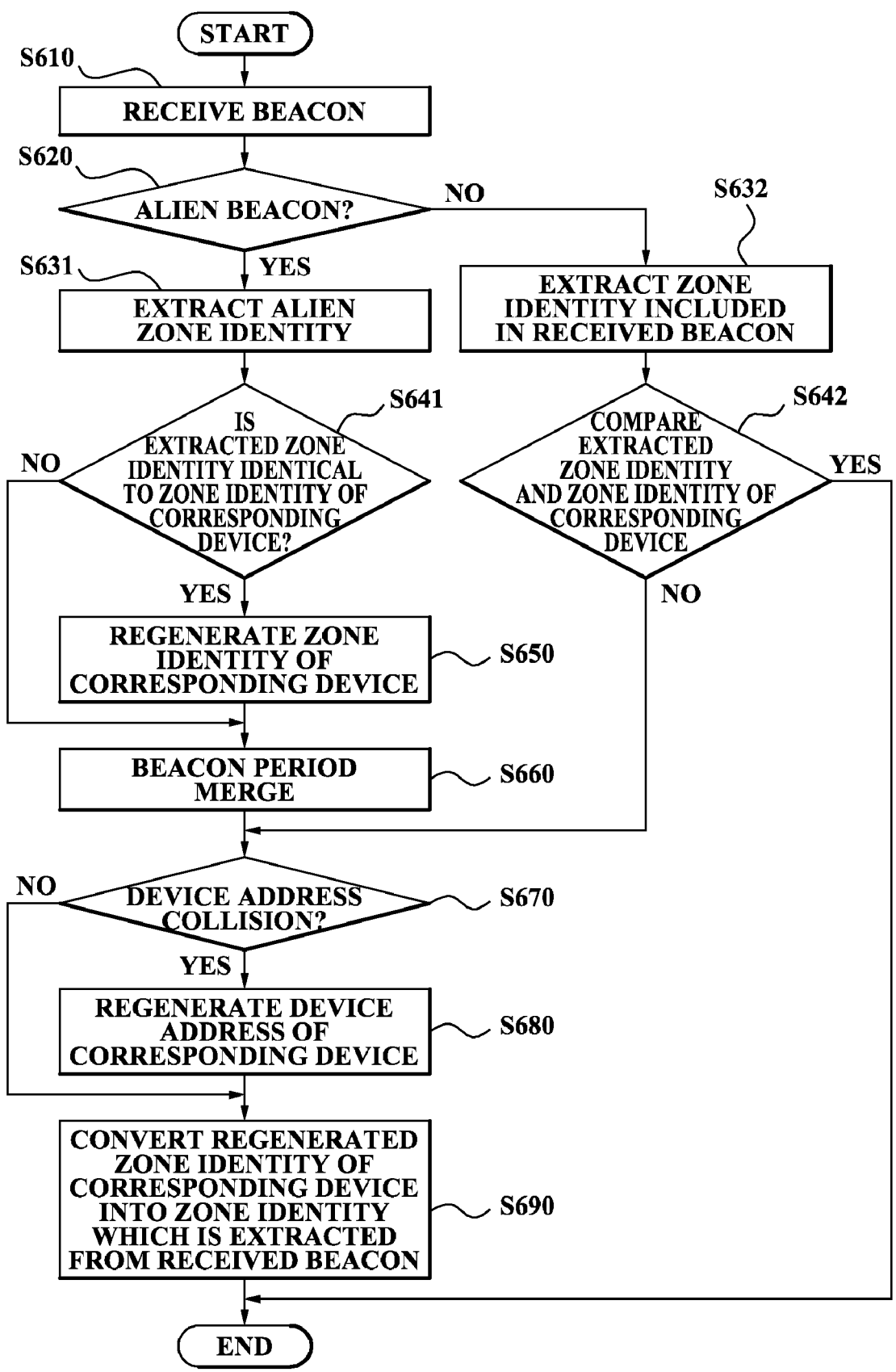
FIG. 6 is a flowchart illustrating a method of generating a device address of a wireless local network according to an exemplary embodiment of the present invention.

FIG. 6 is a flowchart illustrating a method of generating a device address of a wireless local network according to an exemplary embodiment of the present invention.

Here, it is assumed that a device receiving an alien beacon is included in a beacon group which is not a dominant beacon group.

Referring to FIG. 6, in operation S610, a beacon is received in an apparatus for generating a device address of a wireless local network. In operation S620, in the method of generating a device address of a wireless local network, it is determined whether the received beacon is an alien beacon.

In operation S631, an alien zone identity included in the received beacon is extracted when the received beacon is an alien beacon. In operation S641, it is determined whether the extracted zone identity is identical to a zone identity of a corresponding device.

In operation S650, when the extracted zone identity is identical to the zone identity of the corresponding device, the zone identity of the corresponding device is regenerated since a beacon group of the corresponding devices is different from a dominant beacon group.

In operation S660, a beacon period of the beacon group of the corresponding device and a beacon period of an alien beacon group are merged after the zone identity of the corresponding device is regenerated. In operation S670, it is determined whether a device having a device address identical to a device address of the corresponding device is included in the alien beacon group.

In operation S680, the device address of the corresponding device is regenerated when the device address of the alien beacon group is identical to the device address of the corresponding device.

In this case, the corresponding device may regenerate the device address of the corresponding device, based on a beacon slot number of the corresponding device in the merged beacon period.

In this case, the corresponding device may regenerate any one of a plurality of device addresses corresponding to the regenerated zone identity of the corresponding device as the device address of the corresponding device.

In this case, the corresponding device may regenerate any one of a plurality of device addresses corresponding to the zone identity of the alien beacon group as the device address of the corresponding device.

Conversely, a currently used device address of the corresponding device is continuously used, when the device address of the alien beacon group is not identical to the device address of the corresponding device.

However, the device address of the corresponding device may be regenerated, even when the device address of the alien beacon group is not identical to the device address of the corresponding device. In this case, the corresponding device may regenerate any one of a plurality of device addresses, corresponding to the zone identity of the alien beacon group or the regenerated zone identity of the corresponding device, as the device address of the corresponding device.

In operation S690, a predetermined period of time, e.g. 3 superframes, after the device address of the corresponding device is regenerated, the regenerated zone identity of the corresponding device is converted into a zone identity which is extracted from the received beacon, i.e. the alien beacon. Through this, a single beacon group is formed by merging two beacon groups, and thus zone identities of all devices included in merged beacon groups are matched. Specifically, a zone identity of the dominant beacon group of the two beacon groups is converted into the zone identities of all the devices included in the merged beacon groups.

Conversely, as a result of determination in operation S620, when the received beacon is not an alien beacon, i.e. a beacon, which is transmitted from a device of a same beacon group, is received, a zone identity included in the received beacon is extracted in operation S632. In operation S642, the extracted zone identity and the zone identity of the corresponding device are compared.

In operation S670, when the extracted zone identity is different from the zone identity of the corresponding device, it is determined whether the device address of the beacon group is identical to the device address of the corresponding device.

In operation S680, the device address of the corresponding device is regenerated when the device address of the beacon group is identical to the device address of the corresponding device. In operation S690, the zone identity of the corresponding device is converted into the zone identity which is extracted from the received beacon.

In this case, the corresponding device may regenerate the device address of the corresponding device, based on the beacon slot number of the corresponding device in a beacon period.

In operations S632 through S690, the device address of the corresponding device is regenerated after the two beacon groups are merged, and the zone identity of the corresponding device is converted into the zone identity of the dominant beacon group. Accordingly, a device address conflict may be prevented and a continuous communication may be performed.

FIG. 7 is a flowchart illustrating a method of generating a device address of a wireless local network according to another exemplary embodiment of the present invention.

Here, FIG. 7 illustrates an operation where a power is applied to a corresponding device and a device address of the corresponding device is generated.

Referring to FIG. 7, in operation S710, an apparatus which generates a device address of a wireless local network is turned on. In operation S720, it is determined whether a beacon is received during a predetermined period of time, e.g. five superframes.

In operation S750, when the beacon is not received during the predetermined period of time, it is determined that another device included in a beacon group does not exist, and a zone identity is generated.

In this case, the zone identity may be randomly generated.

In operation S760, when the zone identity is generated, a device address of a corresponding device is generated.

In this case, the device address of the corresponding device may be any one of a plurality of device addresses corresponding to the generated zone identity.

In this case, the device address of the corresponding device may be generated based on a beacon slot number of the corresponding device.

In operation S770, a beacon including the generated zone identity and the device address of the corresponding device is generated and transmitted.

Conversely, as a result of the determination in operation 720, when the beacon is received during the predetermined period of time, the zone identity included in the received beacon is extracted in operation S730. In operation S740, the extracted zone identity is set as the zone identity of the corresponding device.

In operation S760, after the extracted zone identity is set as the zone identity of the corresponding device, the device address of the corresponding device is generated.

In this case, the device address of the corresponding device may be any one of a plurality of device addresses corresponding to the set zone identity.

In this case, the device address of the corresponding device may be generated based on the beacon slot number of the corresponding device.

In operation S770, the beacon including the generated zone identity and the device address of the corresponding device is generated and transmitted.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a method and apparatus for generating a device address of a wireless local network which generate a zone identity and a device address corresponding to the generated zone identity, and thereby may prevent device addresses from conflicting.

Also, according to the present invention, a method and apparatus for generating a device address of a wireless local network which add a zone identity to a device address and change the zone identity when receiving an alien beacon period, and thereby may prevent device addresses from conflicting.

Also, according to the present invention, a method and apparatus for generating a device address of a wireless local network which eliminate a possibility of a device address conflict after a mergence with an alien beacon period, and thereby may perform a continuous communication.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus which generates a device address of a wireless local network, the apparatus comprising:
   a processor, the processor functioning as:
      an alien beacon determination unit which determines whether a received beacon is an alien beacon;
      a zone identity management unit which compares an alien zone identity included in the received beacon with a zone identity of a corresponding device if the received beacon is the alien beacon, and regenerates the zone identity of the corresponding device if the alien zone identity is identical to the zone identity of the corresponding device; and
      a device address generation unit which regenerates a device address of the corresponding device if a device address of an alien beacon group is identical to the device address of the corresponding device.

2. The apparatus of claim 1, wherein the zone identity management unit regenerates the zone identity of the corresponding device if a beacon group of the corresponding device is different from a dominant beacon group.

3. The apparatus of claim 1, wherein the zone identity management unit converts the regenerated zone identity of the corresponding device into the alien zone identity, after the device address of the corresponding device is regenerated.

4. The apparatus of claim 1, wherein the zone identity management unit comprises:
   a zone identity detection unit which detects a zone identity included in the received beacon;
   a zone identity comparison unit which compares the detected zone identity with the zone identity of the corresponding device if the received beacon is the alien beacon; and
   a zone identity generation unit which regenerates the zone identity of the corresponding device if the detected zone identity is identical to the zone identity of the corresponding device.

5. The apparatus of claim 1, wherein the device address generation unit regenerates the device address of the corresponding device after a beacon period of a beacon group of the corresponding device and a beacon period of the alien beacon group are merged.

6. The apparatus of claim 5, wherein the device address generation unit regenerates the device address of the corresponding device, based on a beacon slot number of the corresponding device in the merged beacon period.

7. The apparatus of claim 1, wherein the device address generation unit regenerates any one of a plurality of device addresses corresponding to the alien zone identity as the device address of the corresponding device.

8. The apparatus of claim 1, wherein the device address generation unit regenerates any one of a plurality of device addresses corresponding to the regenerated zone identity of the corresponding device as the device address of the corresponding device.

9. The apparatus of claim 1, wherein a sum of a bit length of the zone identity and a bit length of the device address is 16-bits.

10. A method of generating a device address of a wireless local network, the method comprising:
    determining whether a received beacon is an alien beacon;
    comparing an alien zone identity included in the received beacon with a zone identity of a corresponding device if the received beacon is the alien beacon;
    regenerating the zone identity of the corresponding device if the alien zone identity is identical to the zone identity of the corresponding device; and
    regenerating a device address of the corresponding device if a device address of an alien beacon group is identical to the device address of the corresponding device.

11. The method of claim 10, wherein the regenerating of the zone identity of the corresponding device regenerates the zone identity of the corresponding device if a beacon group of the corresponding device is different from a dominant beacon group.

12. The method of claim 10, further comprising:
    converting the regenerated zone identity of the corresponding device into the alien zone identity, after the device address of the corresponding device is regenerated.

13. The method of claim 10, further comprising:
    detecting a zone identity included in the received beacon from the received beacon,
    wherein the comparing is performed after detecting the zone identity included in the received beacon.

14. The method of claim 10, wherein the regenerating of the device address of the corresponding device is performed after a beacon period of a beacon group of the corresponding device and a beacon period of the alien beacon group are merged.

15. The method of claim 14, wherein the regenerating of the device address of the corresponding device regenerates the device address of the corresponding device, based on a beacon slot number of the corresponding device in the merged beacon period.

16. The method of claim 10, wherein the regenerating of the device address of the corresponding device regenerates any one of a plurality of device addresses corresponding to the alien zone identity as the device address of the corresponding device.

17. A computer-readable recording medium storing a program executed by a computer for implementing a method of generating a device address of a wireless local network, the method comprising:

determining whether a received beacon is an alien beacon;
comparing an alien zone identity included in the received beacon with a zone identity of a corresponding device if the received beacon is the alien beacon;
regenerating the zone identity of the corresponding device if the alien zone identity is identical to the zone identity of the corresponding device; and
regenerating a device address of the corresponding device if a device address of an alien beacon group is identical to the device address of the corresponding device.

18. The method of claim 10, wherein the regenerating of the device address of the corresponding device regenerates any one of a plurality of device addresses corresponding to the regenerated zone identity of the corresponding device as the device address of the corresponding device.

* * * * *